(12) United States Patent
Allo

(10) Patent No.: US 11,004,467 B2
(45) Date of Patent: May 11, 2021

(54) DATA STORAGE DEVICE WITH DATA WRITER DEACTIVATION RESPONSIVE TO SECURITY THREATS

(71) Applicant: Seagate Technology LLC, Cupertino, CA (US)

(72) Inventor: Christopher Nicholas Allo, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/408,738

(22) Filed: May 10, 2019

(65) Prior Publication Data
US 2019/0348070 A1    Nov. 14, 2019

Related U.S. Application Data

(60) Provisional application No. 62/670,424, filed on May 11, 2018.

(51) Int. Cl.
| | | |
|---|---|---|
| G11B 5/40 | (2006.01) | |
| G11B 5/39 | (2006.01) | |
| G06F 1/3234 | (2019.01) | |
| G06F 21/78 | (2013.01) | |
| G11B 23/28 | (2006.01) | |
| G11B 5/31 | (2006.01) | |

(52) U.S. Cl.
CPC .............. *G11B 5/40* (2013.01); *G06F 1/3268* (2013.01); *G06F 21/78* (2013.01); *G11B 5/3922* (2013.01); *G11B 23/284* (2013.01); *G11B 5/3106* (2013.01)

(58) Field of Classification Search
None
See application file for complete search history.

(56) References Cited

U.S. PATENT DOCUMENTS

| | | | | |
|---|---|---|---|---|
| 4,785,361 A | * | 11/1988 | Brotby | G06F 21/80 360/60 |
| 5,212,602 A | * | 5/1993 | Suzuki | G06K 7/084 360/110 |
| 5,280,398 A | * | 1/1994 | Wade | G11B 19/04 360/137 |
| 6,272,086 B1 | * | 8/2001 | Jaquette | G11B 11/10502 369/13.02 |
| 6,272,533 B1 | | 8/2001 | Browne | |
| 6,400,534 B1 | | 6/2002 | Klaassen | |
| 6,603,620 B1 | * | 8/2003 | Berding | G11B 19/04 360/60 |
| 6,879,454 B2 | | 4/2005 | Winarski et al. | |
| 6,891,702 B1 | | 5/2005 | Tang et al. | |
| 6,972,930 B1 | | 12/2005 | Tang et al. | |
| 7,119,995 B2 | | 10/2006 | Granstrom et al. | |
| 7,151,654 B1 | | 12/2006 | Mao et al. | |
| 7,161,772 B2 | | 1/2007 | Iben | |

(Continued)

*Primary Examiner* — Tan X Dinh
(74) *Attorney, Agent, or Firm* — Hall Estill Attorneys at Law

(57) ABSTRACT

A data storage device can transition a functional data storage medium into a read only data surface. Data can be written to a data storage medium with a data writer of a transducing head prior to a security threat being identified. A write head of the transducing head is deactivated in response to the security threat by selecting a permanent deactivation mechanism.

20 Claims, 3 Drawing Sheets

(56) References Cited

U.S. PATENT DOCUMENTS

| | | | |
|---|---|---|---|
| 7,180,418 B1* | 2/2007 | Willms | G08B 25/10 |
| | | | 250/287 |
| 7,984,315 B2* | 7/2011 | Ito | G06F 1/3268 |
| | | | 360/69 |
| 9,691,419 B1 | 6/2017 | Olson et al. | |
| 10,665,263 B1* | 5/2020 | Xiong | G11B 21/106 |
| 2004/0012875 A1* | 1/2004 | Wood | G06K 7/084 |
| | | | 360/55 |
| 2005/0162785 A1* | 7/2005 | Granstrom | G11B 5/3906 |
| | | | 360/323 |
| 2005/0231846 A1* | 10/2005 | Winarski | G11B 27/11 |
| | | | 360/69 |
| 2005/0235095 A1* | 10/2005 | Winarski | G11B 27/11 |
| | | | 711/4 |
| 2006/0087760 A1 | 4/2006 | Forrer, Jr. et al. | |
| 2012/0099219 A1* | 4/2012 | Al-Azzawi | G06F 21/56 |
| | | | 360/62 |
| 2019/0347020 A1* | 11/2019 | Allo | G06F 12/023 |

* cited by examiner

DATA STORAGE DEVICE WITH DATA WRITER DEACTIVATION RESPONSIVE TO SECURITY THREATS

RELATED APPLICATION

The present application makes a claim of domestic priority under 35 U.S.C. 119(e) to U.S. Provisional Application No. 62/670,424 filed May 11, 2018, the contents of which are hereby incorporated by reference.

SUMMARY OF THE INVENTION

A data storage system, in accordance with some embodiments, has a transducing head with a data writer, data reader, and permanent deactivation mechanism. The permanent deactivation mechanism is configured to permanently deactivate the data writer upon selection by a connected controller.

Various embodiments configure a data storage device with data being written to a data storage medium with a data writer of a transducing head prior to a security threat being identified. A data writer of the transducing head is deactivated in response to the security threat by selecting a permanent deactivation mechanism.

In other embodiments, data is written to a data storage medium of a data storage device with a data writer of a transducing head. A security threat is predicted with a prediction module of a controller connected to the transducing head and the controller subsequently deactivates the data writer in response to the predicted security threat by selecting a permanent deactivation mechanism.

DETAILED DESCRIPTION

Progression of data processing and storage has allowed increasing amounts of data to be generated, transferred, and stored. Advancements in network communications have allowed greater numbers of hosts to connect to, and access data from, remote data storage devices. Such heightened data movement and number of data accessing hosts raises security risks for data stored in a data storage device as unwanted data attacks can be conducted quickly and anonymously via the efficiency of a distributed network data storage system.

Hence, various embodiments are generally directed to mitigating detected and/or predicted security threats by permanently deactivating a data writing portion of a data storage device. The inability to write data allows a data storage device to remain a functional data reading mechanism without exposing a data storage system to inadvertent data manipulation and insertion by a nefarious third-party. The prediction of a security threat can be utilized by a data storage device to proactively conduct countermeasures, move data, and alter security protection that can optimize a read only data storage surface of a data storage device.

Figure 1:
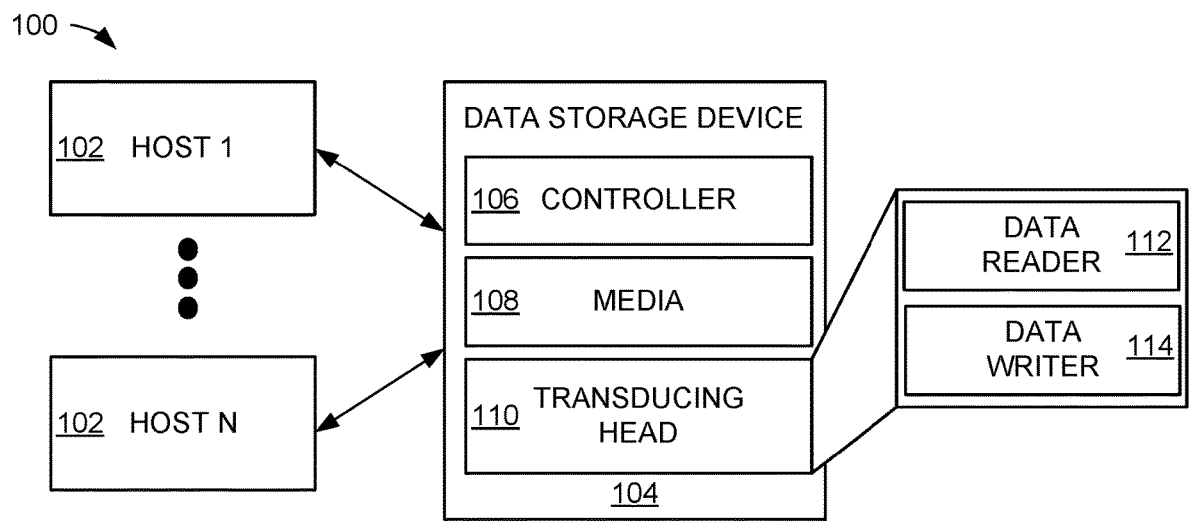
FIG. 1 is a block representation of an example data storage system arranged in accordance with various embodiments.

Turning to the drawings, a block representation of an example data storage system 100 is displayed in FIG. 1. The data storage system 100 is arranged in accordance with various embodiments to connect a number (N) of remote hosts 102 with one or more data storage devices 104 via a wired and/or wireless network, as conveyed by dual-sided arrows. It is noted that a data storage device 104 can be incorporated into the data storage system 100 with any type of data storage, data storage capacity, and data storage performance characteristics. However, at least one data storage device 104 is configured with a local controller 106 that directs data accesses to, and from, one or more magnetic data storage media 108 via a transducing head 110.

Figure 2:
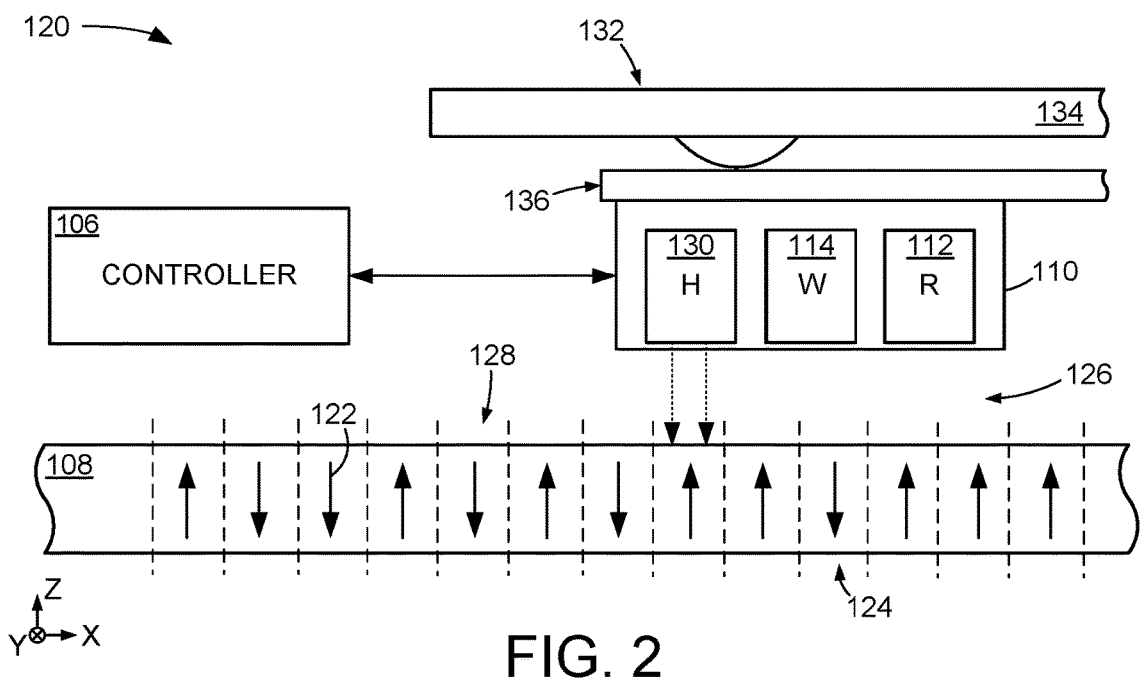
FIG. 2 displays a line representation of portions of an example data storage device that may be utilized in the data storage system of FIG. 1.

The transducing head 110 has at least a data reader 112 and a data writer 114 that operate at the discretion of the controller 106 to service data accesses (reads & writes) from one or more remote hosts 102. FIG. 2 illustrates portions of an example data storage device 120 that can be employed in the data storage system 100 of FIG. 1 in some embodiments. The cross-sectional line representation of FIG. 2 conveys how a transducing head 110 can access one or more data bits 122 organized into a plurality of different data tracks 124 on a magnetic data storage medium 108.

The data storage medium 108 rotates about a spindle as directed by the controller 106 to create an air bearing 126 that separates the transducing head 110 from a recording surface 128 of the data storage medium 108. Although not required or limiting, the transducing head 110 may have a heating element 130 that acts upon the data storage medium 108 to reduce the magnetic coercivity of the data bits 122. The transducing head 110 may be held above the data storage medium 108 by an actuating suspension 132 that consists of a load beam 134 and tongue 136 arranged to maintain the position of the transducing head 110 over a selected data track 124 and data bits 122.

Figure 3:
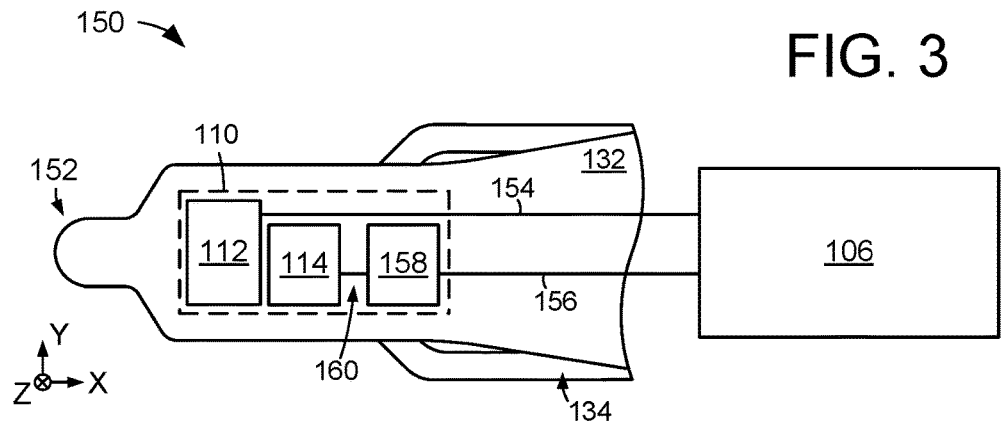
FIG. 3 depicts portions of an example data storage device configured and operated in accordance with assorted embodiments.

FIG. 3 shows a top view line representation of portions of an example data storage device 150 configured in accordance with various embodiments. The load beam 134 and tongue 136 each continually extend from an actuating mechanism (not shown) to present the transducing head 110 over selected portions of a data storage medium, as displayed in FIG. 2. The load beam 134 can have a beam tip 152 that is proximal the transducing head 110 and aids in parking and startup operations of the data storage device 150.

As illustrated, the controller 106 is connected to the data reader 112 via a first signal pathway 154 while connection to the data writer 114 is facilitated via a second signal pathway 156 that passes through a permanent deactivation mechanism 158. That is, the permanent deactivation mechanism 158 is connected to the controller 106 with a first portion of second signal pathway 156 and to the data writer 114 via a second portion 160 of the second signal pathway 156. It is contemplated that the permanent deactivation mechanism 158 is constructed to complete the electrical connection of the first and second 160 portions of the second signal pathway 156 to allow data writer 114 operation as directed by the controller 106.

Upon selection of the permanent deactivation mechanism 158 by the controller 106, the electrical connection between the first and second 160 portions of the second signal pathway 156 is permanently severed, which prevents operation of the data writer 114. While not limiting, various embodiments configure the permanent deactivation mechanism 158 as a shunt, fuse, one-way switch, or other permanently electrically isolating component upon selection. It is noted that the selection of the permanent deactivation mechanism 158 may additionally damage the data writer 114 in a manner that prevents operation even if the second signal pathway 156 was somehow reconstructed to pass electrical current to the data writer 114. As such, some embodiments position the permanent deactivation mechanism 158 in the circuitry of the data writer 114 to effectively kill the data writer 114 upon selection from the controller 106.

The ability to selectively deactivate the data writer 114 while maintaining operation of the data reader 112 via the first signal pathway 154 allows for the transducing head 110 to be a data read only component. The data read only transducing head 110 mitigates the risk of a security threat manipulating, or adding, data resident in the data storage medium. In addition, having a read only transducing head 110 allows for a number of different data access performance optimizations for a data storage device despite not having the capability of writing data.

Figure 4:
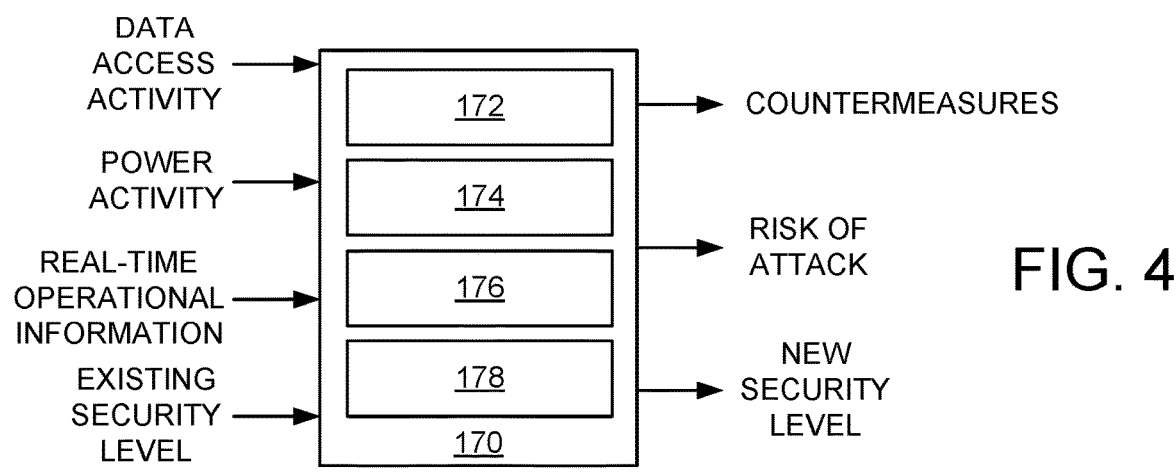
FIG. 4 shows an example security module that can be employed in the data storage system of FIG. 1 in accordance with various embodiments.

FIG. 4 is a block representation of an example security module 170 that can be employed by a controller 106 to assess security threats to a data storage device and system. The security module 170 comprises circuitry that intelligently determines at least a risk of a security attack, any available security countermeasures, and any new security levels for data resident on a data storage medium from various detected parameters.

The security module 170 can maintain a security log 172 in local, or remote, memory that tracks detected security parameters, such as data accesses, power levels, host credentials, and encryption key usage. The security log 172 may be accessed by a power analysis engine 174, access analysis engine 176, and attack analysis engine 178 to determine if a credible security threat is occurring, or has occurred. It is noted that the various engines 174/176/178 can operate independently and concurrently to identify artificial deviations in at least power consumption, type of data accesses, number of data accesses, and encryption verification that indicate a security breach has, or will, occur.

While any amount and type of information may be utilized by the security module 170, various embodiments provide data access history, power consumption activity, existing security level, and real-time operational information, such as bit error rate and data latency to allow the assorted engines 174/176/178 to determine if, when, and at what probability a security attack is present. Such security attack determination allows the security module 170 to assign a proper security level going forward as well as a risk map of user-generated data that correlates security risk of inadvertent alteration by an unauthorized user with logical block addresses (LBAs), such as by user data region or by user-generated data LBA.

With a security threat being identified proactively and/or reactively, the security module 170 can issue one or more countermeasures to increase security and/or reduce the security threat. As a non-limiting example, a countermeasure may move data, reformat portions of a data storage medium, pause servicing data service requests, or require additional security credentials from hosts. The ability to execute one or more countermeasures to reduce security threats and/or mitigate the effects of a security breach can optimize the performance of a data storage device, particularly in distributed data networks where numerous anonymous hosts can access portions of a data storage device.

Figure 5:
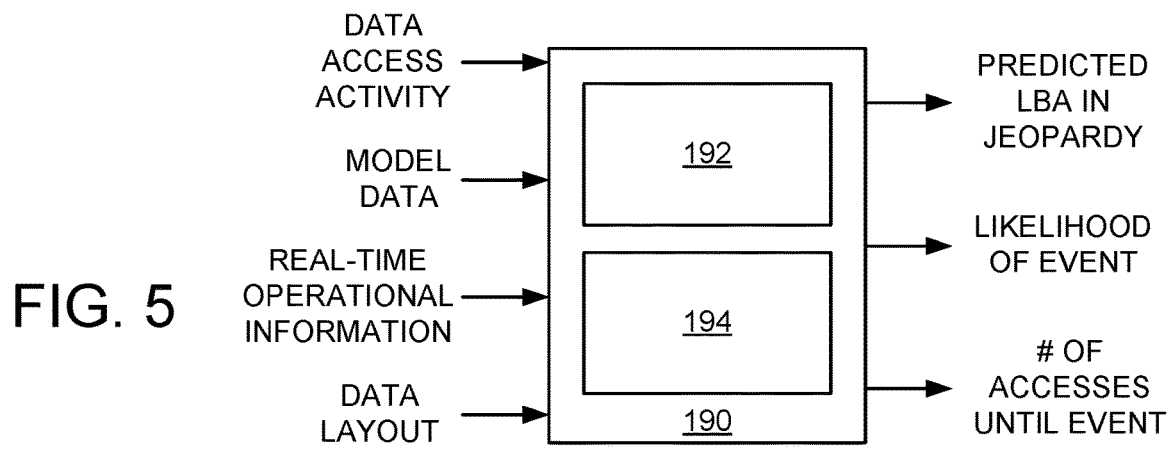
FIG. 5 conveys an example prediction module that may be utilized in the data storage system of FIG. 1 in accordance with some embodiments.

A data storage device controller 106 can selectively utilize the prediction module 190 alone, or in combination with the security module 170, to provide optimized performance that adapts to changing data accesses activity and security levels for user-generated data stored on a data storage medium. FIG. 5 displays a block representation of an example prediction module 190 that can be utilized in accordance with various embodiments. The prediction module 190 can be circuitry resident in, or utilized by, a local data storage device controller 106 to process detected operational activity in a data storage device into one or more operational predictions. The prediction module 190 can input data access history, such as the number and times of data reads and writes, along with modeled data from other data storage devices, measured performance metrics, such as bit error rate (BER), and data layout to predict at least a risk of an operational event that may put user-generated data at risk.

The prediction module 190 may utilize an analysis engine 192 to identify and correlate real-time data accesses with logged, and/or model, data. Such correlation may be further analyzed with respect an error log 194 of faults occurring in the data storage device in which the user-generated data is stored. Model data may be stored in local memory and employed by the circuitry of the analysis engine 192 to predict future events while being information pertaining to other data storage devices. The analysis engine 192 can utilize real-time, and previously detected, BER for a data storage device, particular data storage medium, particular transducing head, and particular user data region to identify the current data storage device performance and performance trends over time.

The data layout utilized by the prediction module 190 can be any information about the logical and/or physical structure of user-generated data. For example, data layout information may be the physical size of user data sections, the average LBA size of user-generated data, the density of user-generated data on a data storage medium, and location of rarely accessed ("cold") data. Such data layout information allows the prediction module 190 to more accurately identify a security threat along with the likelihood of a security breach event will occur at a particular LBA.

With the analysis engine 192 and error log 194, the prediction module 190 can predict a security event, such as a data tampering, removal, or addition, the likelihood the event will occur, and an approximate number of data accesses until the event occurs. Such event prediction can correlate real-time detected operations with past logged events and/or modeled data stored and accessed by the prediction module 190 to identify what user-generated data is in jeopardy and how likely a security or error event is to occur for that user-generated data.

Figure 6:
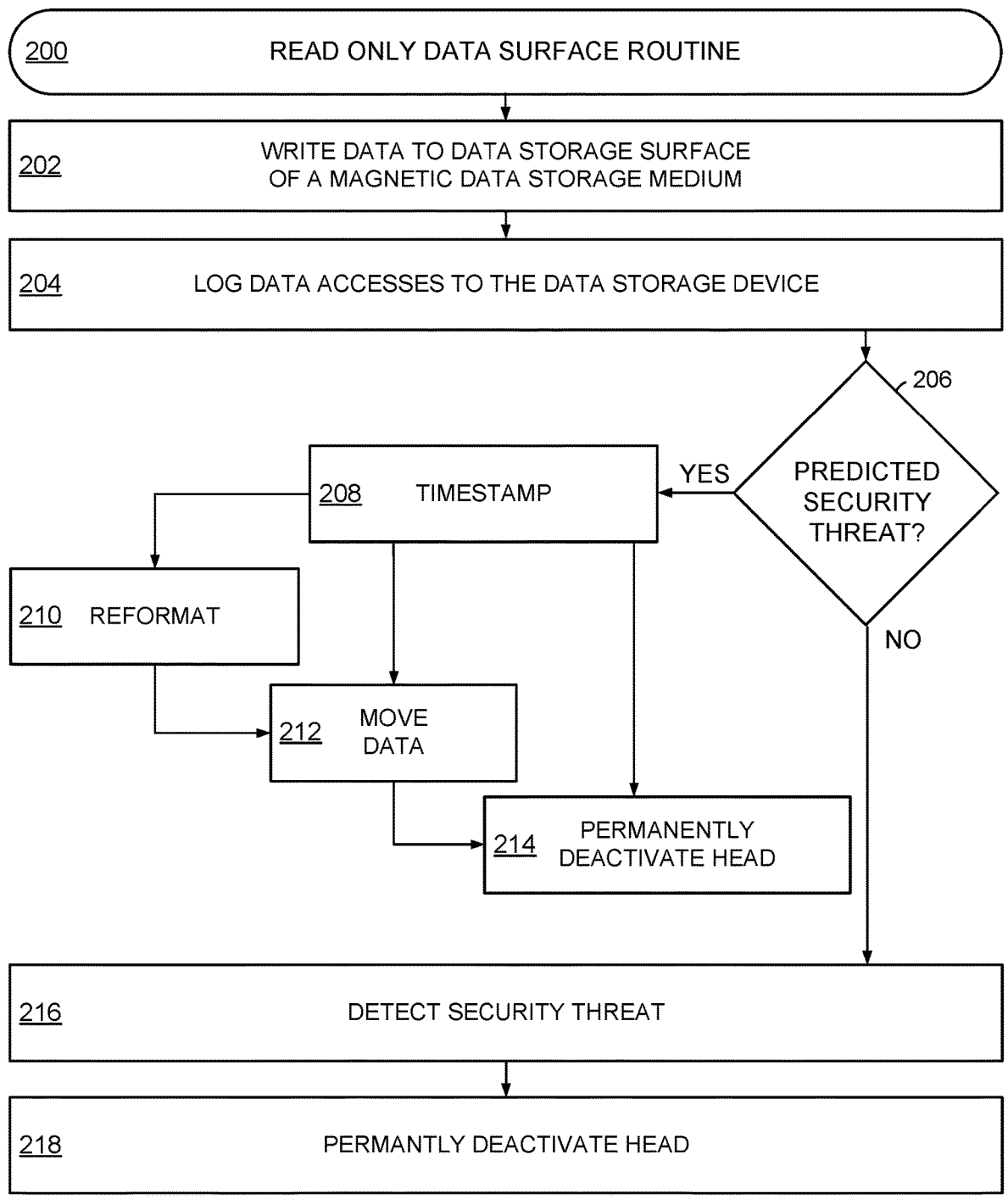
FIG. 6 provides a flowchart of an example read only data surface routine that can be carried out by the assorted embodiments of FIGS. 1-5.

The security module 170 and prediction module 190 can be employed along with the permanent deactivation mechanism 158 to mitigate potential and/or actual security threats and breaches by selectively killing a data writer. FIG. 6 depicts a flowchart of an example read only data surface routine 200 that intelligently kills a data writer to create a read only data surface. Any number of data accesses from any number of remote hosts can result in step 202 writing user-generated data to one or more data storage surfaces of at least one data storage medium. Those data accesses are logged in step 204 to allow for analysis by at least the prediction and security modules at the discretion of a data storage device controller.

Decision 206 determines if a viable security threat is predicted. Decision 206 may evaluate the risk of a future security threat with a predetermined threshold, such as greater than 90% risk a threat will occur in the next 24 hours or greater than 50% risk a threat will occur in the next hour. A predicted security threat triggers step 208 to timestamp the data stored on a threatened data surface. That is, prior to converting a data surface to a read only surface, the data resident on the data surface is cataloged with one or more timestamps written to the data surface. A timestamp may have any information pertaining to the data of the data surface, but has at least the most recent date data was written. The timestamp may also incorporate the type of data, security level of data, and host source information about each user-generated data of the data surface.

Although timestamping can increase the integrity of data of a data recording medium, step 208 is optional and is not required. As such, a predicted security threat can proceed to reformat some, or all, of a data surface in step 210, move data to, or from, a data surface in step 212, and/or permanently deactivate a transducing head in step 214 with, or without, timestamping data of the data surface. By reformatting a data surface and subsequently repopulating data, any security exposure involving the location and/or contents of data will be lost. The moving of data can also mitigate security expose and allows for data that will not be rewritten, such as security keys, encryption codes, and biographical system information.

While the ability to predict some security threats allows for proactive countermeasures and activity to mitigate, or eliminate, events that jeopardize the integrity of stored data, some security threats may occur without prediction. If so, step 216 detects a security threat while it is occurring, or after the threat has occurred. Such detection may identify an unauthorized data write or data read, detect data has been altered, or discover an error during a data access. A detected security threat does not require a data writer to be permanently deactivated, but if a controller deems the security threat significant enough to pose an ongoing threat to the integrity of the data storage device or data storage system, step 218 is executed to select the permanent deactivation mechanism of one or more transducing heads.

Through the various embodiments of the present disclosure, a transducing head of a data storage device has a permanent data writer deactivation mechanism that allows a data surface to become read only. The ability to proactively engage in activities to mitigate predicted security threats allows a data storage device to be more secure while maintaining high data storage performance, such as low data access latency and error rates. The ability to assess and adapt to detected security threats by selecting a permanent deactivation mechanism allows a data storage device to reduce the short-term and long-term effects of the security breach.

What is claimed is:

1. An apparatus comprising a transducing head comprising a data writer, data reader, and permanent deactivation mechanism, the permanent deactivation mechanism configured to sever an electrical connection to the data writer to permanently deactivate the data writer upon selection by a connected controller in response to a security threat identified by a security module of a controller connected to the transducing head, the data reader remaining operational after the data writer is permanently deactivated.

2. The apparatus of claim 1, wherein the transducing head is separated from a magnetic data storage medium by an air bearing.

3. The apparatus of claim 1, wherein the permanent deactivation mechanism is a fuse.

4. The apparatus of claim 1, wherein the permanent deactivation mechanism is a shunt.

5. The apparatus of claim 1, wherein the permanent deactivation mechanism is positioned between first and second portions of a signal pathway between the controller and the data writer.

6. A method comprising:
writing data to a data storage medium with a data writer of a transducing head;
identifying a security threat with a security module of a controller connected to the transducing head;
deactivating the data writer in response to the security threat by selecting a permanent deactivation mechanism to sever an electrical connection to the data writer; and
reading data from the data storage medium with a data reader of the transducing head.

7. The method of claim 6, wherein selection of the permanent deactivation mechanism damages the data writer to prevent any future data writing operation.

8. The method of claim 6, wherein the security threat is identified by an attack analysis engine of the a security module.

9. The method of claim 6, wherein the security module determines a risk of a security threat.

10. The method of claim 6, wherein the security module generates a new security level for user-generated data based on the identified security threat.

11. The method of claim 6, wherein the security module generates a countermeasure in response to the identified security threat.

12. The method of claim 6, wherein the security module comprises a power analysis engine that monitors power consumption of the transducing head.

13. The method of claim 6, wherein the security module comprises an access analysis engine that monitors detected data accesses from the transducing head.

14. The method of claim 6, wherein selection of the permanent deactivation mechanism make a data surface of the data storage medium read only.

15. The method of claim 6, wherein the data writer and data reader of the transducing head are each positioned on a tongue of a actuating suspension.

16. A method comprising:
writing data to a data storage medium with a data writer of a transducing head;
predicting a security threat with a prediction module of a controller connected to the transducing head;
deactivating the data writer in response to the predicted security threat by selecting a permanent deactivation mechanism to sever an electrical connection to the data writer; and
reading data from the data storage medium with a data reader of the transducing head.

17. The method of claim 16, wherein the security threat is predicted for a particular logical block address of the data storage medium.

18. The method of claim 16, wherein the prediction module generates a likelihood of a security threat occurring.

19. The method of claim 16, wherein the controller reformats a portion of the data storage medium in response to the predicted security threat.

20. The method of claim 16, wherein the data writer writes data to the data storage medium in response to the predicted security threat prior to deactivation of the data writer.

* * * * *